June 6, 1933. W. BARBER 1,912,355
EXTENSION TOP FOR AUTOMOBILES
Filed Feb. 10, 1930 2 Sheets-Sheet 2
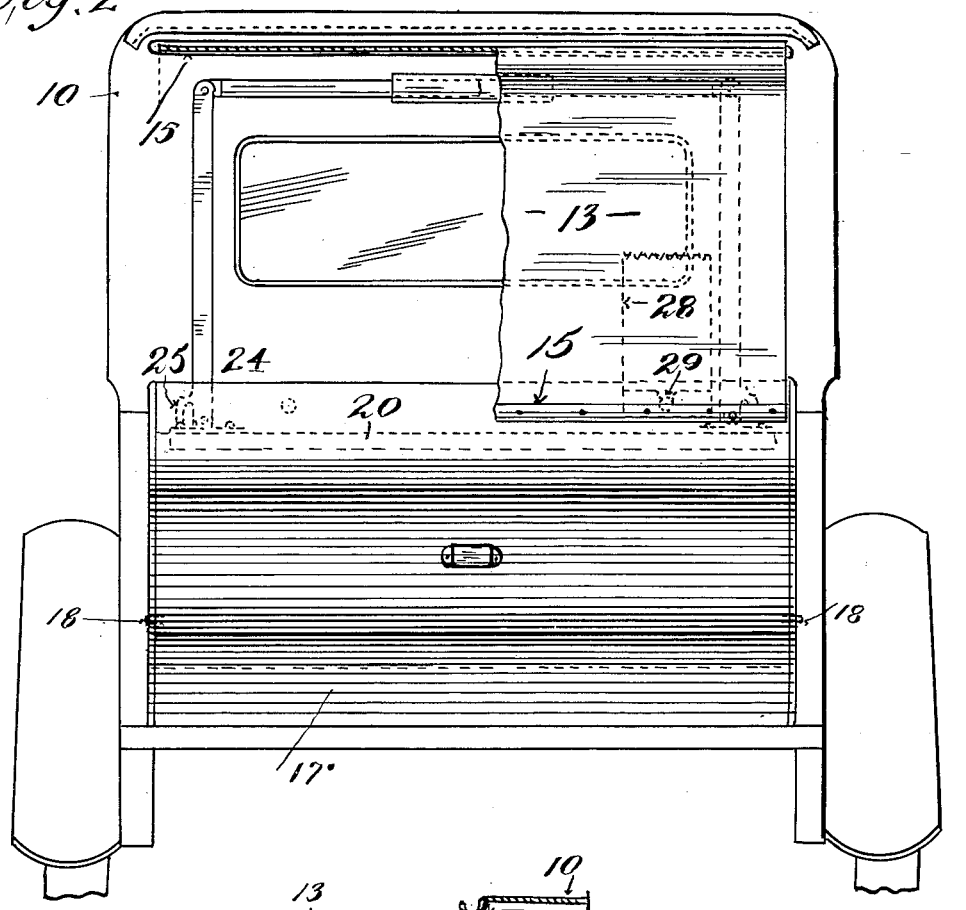
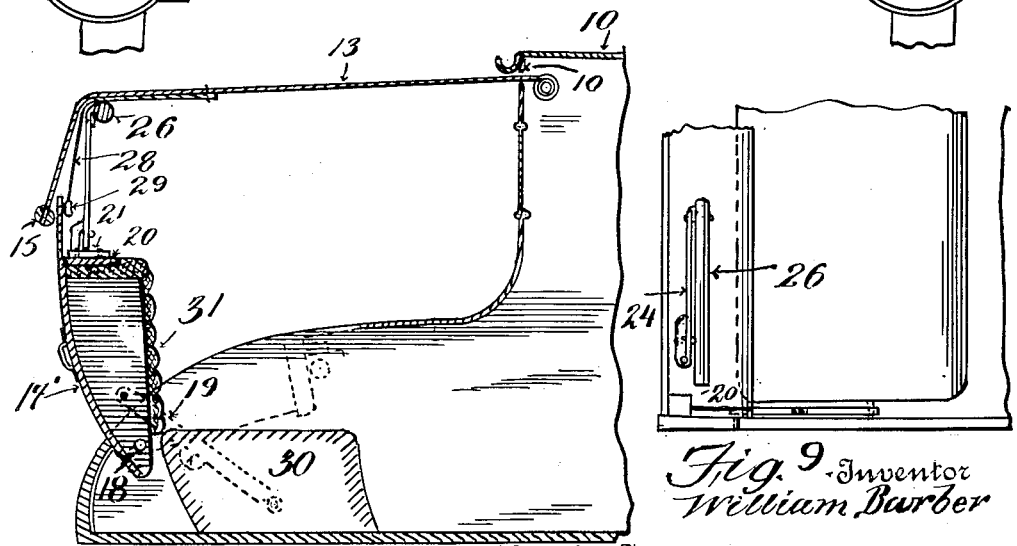

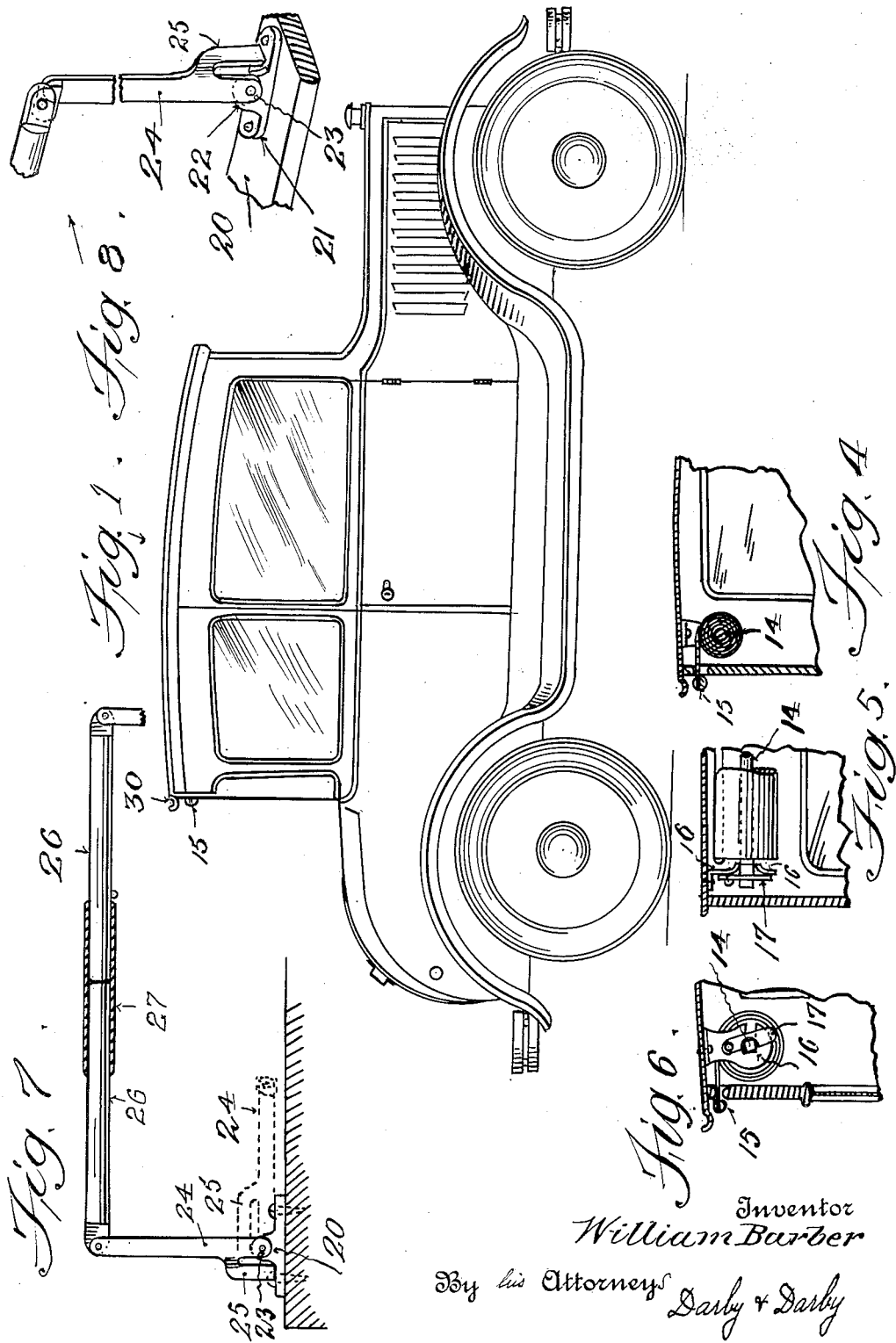

Patented June 6, 1933

1,912,355

UNITED STATES PATENT OFFICE

WILLIAM BARBER, OF BROOKLYN, NEW YORK, ASSIGNOR TO ADA S. BARBER

EXTENSION TOP FOR AUTOMOBILES

Application filed February 10, 1930. Serial No. 427,332.

This invention relates to extension tops for automobiles and the like and has for its object the provision of a simple but effective folding cover and accessories for supporting the cover over a car seat, for example.

Another object includes the provision of means for readily opening and closing the cover without leaving the car seat.

A further object includes the provision of a foldable supporting bracket which is readily opened up and fastened in position to support the top in order to shield persons from wind and weather when riding.

Other objects will appear hereinafter and I attain these objects by the construction illustrated in the accompanying drawings, in which Figure 1 represents a side elevational view of a car equipped with my invention;

Fig. 2 is a rear elevational view of a car thus equipped showing the foldable top supporting bracket in position and the cover thereover but partially removed for a better view of the bracket;

Fig. 3 is a side elevational view showing the extensible cover in position over the bracket and fastened onto the folding back of the folding seat;

Fig. 4 is a fragmentary view of a portion of an automobile top showing the position of the extension top folded;

Fig. 5 is a fragmentary view of a portion of the folded roll and showing the lock device at one end thereof;

Fig. 6 is a fragmentary view of a portion of the top showing an end view of the roll and the lock device therefor;

Fig. 7 is a view of the supporting bracket in open position;

Fig. 8 is a broken view of one end of the supporting bracket showing the upright stay in open position; and Fig. 9 is a fragmentary view of a portion of the rear part of an automobile seat showing one side of the bracket in folded position.

Like numerals refer to the same parts wherever they occur in the several views.

It is the prime purpose of my invention to provide an extensible folding cover which is carried in the top portion of the automobile when not in use and which can be readily withdrawn from its position and fastened on supports at the back of the rear seat as shown in Fig. 3. The cover is rolled on a supporting roller and is held in closed position when not in use. The roller carrying the cover is fastened in the upper part of the automobile top and is provided with a lock device for readily fastening the roll in position.

Referring now to the drawings I provide the upper portion of an automobile body top 10 with an opening 12 in the rear horizontal wall thereof through which the cover 13 may be drawn when open and withdrawn when closed as shown in Fig. 3 for example. The cover 13 is supported in the upper portion of the top immediately opposite the opening therein in such a manner that it may be rolled and unrolled upon a suitable rod 14 which rod is supported on brackets at the end thereof, one end of which is shown at Figs. 5 and 6. Any suitable bracket such as bracket 16 having a latch 17 may be provided. Latch 17 holds the rod against turning so as to permit the cover to roll upon the rod in the manner well known and which is not a part of my invention and, therefore, has not been described. The end of the cover is provided with a stop piece 15 which stop piece serves as means by which the cover is pulled out over the supporting bracket as indicated in Fig. 3. I provide also an apron or cover flap 28 near each side and outer end of the cover top. This cover flap serves as means by which the extensible cover is withdrawn or opened and fastened over the cross bar 26 and then fastened to a button 29 on the rear portion of the folding back. The folding back 17' is pivotally mounted at 18 on the automobile body and is held by a bracket 19 in open position. A cross piece 20 on the upper part of the folded back serves as a means of support for an anchor block at each end thereof. Each anchor block is provided with an ear 22 on which is pivotally fastened the finger 23 of the upright stay 24. Said upright is also provided with a stop finger 25 which engages the outer extension of the anchor block and prevents the same from opening beyond the limit of the stop finger. At the upper end of the upright stay 24 there is pivotally fastened a cross bar 26. This cross bar is provided at its free end with a sleeve 27 and engages the opposing cross bar 26 on the opposite side of the bracket. When not in use the two members may be folded by merely slipping one of the cross bars out of the roller sleeve 27 and then folding the parts side by side as indicated in Fig. 9. When in this position the folding back 17' may be closed as shown in Fig. 1. The only portion of the folding top visible is stop piece 15. Immediately above the stop piece 15 there is provided a water channel to prevent rain from running down on the inside. The seat is indicated at 30 in Fig. 3. The tufted upholstering on the back portion of the folding back is shown at 31.

From the description thus far given it is apparent that the foldable extension top is simple and easily closed by a person in the car seat. All that is necessary to close the cover is to unbutton buttons 29 of the apron 28 on each side of the vehicle. One of these buttons is shown on the righthand side of Fig. 2. When the cover is thus unfastened it will roll up on the roller 14 as indicated in Fig. 4. The bracket is then released and folded as indicated in Fig. 9.

Having now described my invention what I claim as new and useful is:

1. In an automobile extension top, a folding seat back, a cross piece mounted on the top surface of said back, an anchor block at each end of said cross piece, said anchor blocks each having an ear, an upright pivotally mounted on each of said ears and an integral stop finger on each of said uprights bent at a substantial angle with respect thereto for limiting the outward movement of said uprights by contacting with said anchor blocks.

2. In an automobile extension top, a folding seat back, a cross piece on said back, an anchor block at each end of said cross piece, said anchor blocks each having an ear, an upright pivotally mounted on each of said ears, a stop finger integrally secured on each of said uprights at an angle with respect thereto for limiting the outward and sideways movement of said uprights by contacting with said anchor blocks, cross bars pivotally held on said uprights to be joined together at their free ends, and means for joining the cross bars at said free ends.

3. In an automobile body having a rumble seat, said body having an elongated horizontal slit adjacent the top thereof and an extension cover within said body arranged to be moved through said slit, means within said body for tensioning and rolling said cover, means extending along the edge of said cover for limiting the rolling thereof, a cross piece mounted along the upper edge of the rumble seat back, an upright member pivotally mounted at either end of said cross piece, a member integrally secured to each of said uprights adjacent said pivotal mounting and bent substantially at right angles thereto to prevent displacement of said upright members in forward and sidewise directions when moved on their pivots into an upright position, cross bars pivotally secured to the free ends of each of said upright members, a ferrule for joining said cross bars at their free ends to form a horizontal cross-piece parallel to and substantially in alignment with the elongated slit to provide a support for the extension cover, and means for securing said extension cover to the top of the rumble seat back after it has been drawn thereover.

4. In combination with an automobile having a top formed with an elongated narrow slit adjacent the upper surface thereof, a body, a disappearing seat adapted to be encased in said body, of a horizontal cross-piece mounted on the top surface of said disappearing seat, an upright member pivotally mounted at each end of said cross-piece, a stop finger integrally secured to each of said upright members adjacent the pivotal mounting thereof and bent therefrom substantially at right angles to the plane of said uprights for limiting the outward and sidewise movement thereof, cross bars pivotally secured to the free ends of said upright members, means for joining said cross bars to form a horizontal cross piece member at the top of the upright members, a flexible cover disposed within said top mounted on a tension roller and having its free end extending through the slit in the top, a stop member extending over the width of said cover and secured to the free end thereof which extends without said slit, and means on said cover and on the rumble seat back for holding said cover in extended position when the same has been unrolled and carried over the horizontal cross member.

In testimony whereof I have hereunto set my hand on this 31st day of January, A. D. 1930.

WILLIAM BARBER.